United States Patent
Thampy et al.

(10) Patent No.: US 11,616,682 B2
(45) Date of Patent: Mar. 28, 2023

(54) THRESHOLD SELECTION FOR KPI CANDIDACY IN ROOT CAUSE ANALYSIS OF NETWORK ISSUES

(71) Applicant: Cisco Technology, Inc., San Jose, CA (US)

(72) Inventors: Sajjit Thampy, San Jose, CA (US); Santosh Ghanshyam Pandey, Fremont, CA (US); Jean-Philippe Vasseur, Saint Martin d'uriage (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/716,913

(22) Filed: Apr. 8, 2022

(65) Prior Publication Data
US 2022/0231903 A1    Jul. 21, 2022

Related U.S. Application Data

(63) Continuation of application No. 17/104,091, filed on Nov. 25, 2020, now abandoned, which is a (Continued)

(51) Int. Cl.
*H04L 41/0631* (2022.01)
*H04L 43/067* (2022.01)
(Continued)

(52) U.S. Cl.
CPC ....... *H04L 41/0631* (2013.01); *H04B 17/309* (2015.01); *H04L 43/04* (2013.01); (Continued)

(58) Field of Classification Search
CPC ... H04L 41/0631; H04L 43/04; H04L 43/067; H04L 43/0823; H04B 17/309; H04W 24/04; H04W 28/04
See application file for complete search history.

(56) References Cited

U.S. PATENT DOCUMENTS 8,380,838 B2    2/2013   Bose et al.
9,026,851 B2 *  5/2015   Mondal .............. G06F 11/0709
                                                           714/26

(Continued)

FOREIGN PATENT DOCUMENTS

WO    WO-2013010565 A1    1/2013

*Primary Examiner* — Philip C Lee
(74) *Attorney, Agent, or Firm* — Behmke Innovation Group LLC; James M. Behmke; Jonathon P. Western

(57) ABSTRACT

In one embodiment, a network assurance service that monitors a network maps time series of values of key performance indicator (KPIs) measured from the network to lists of unique values from the time series. The service sets a target alarm rate for anomaly detection alarms raised by the network assurance service. The service uses an optimization function to identify a set of thresholds for the KPIs. The optimization function is based on: a comparison between the target alarm rate and a fraction of network issues flagged by the service as outliers, KPI thresholds selected based on the lists of unique values from the time series, and a number of thresholds that the KPIs must cross for the service to raise an alarm. The service raises an anomaly detection alarm for the monitored network based on the identified set of thresholds for the KPIs.

20 Claims, 7 Drawing Sheets

Related U.S. Application Data continuation of application No. 16/131,143, filed on Sep. 14, 2018, now Pat. No. 10,897,389.

(51) Int. Cl.

| | | |
|---|---|---|
| *H04L 43/04* | (2022.01) | |
| *H04W 24/04* | (2009.01) | |
| *H04B 17/309* | (2015.01) | |
| *H04L 43/0823* | (2022.01) | |
| *H04W 28/04* | (2009.01) | |

(52) U.S. Cl.
CPC ........ *H04L 43/067* (2013.01); *H04L 43/0823* (2013.01); *H04W 24/04* (2013.01); *H04W 28/04* (2013.01)

(56) References Cited

U.S. PATENT DOCUMENTS

| | | | |
|---|---|---|---|
| 9,130,860 B1* | 9/2015 | Boe | G06F 16/9535 |
| 9,401,851 B2* | 7/2016 | Kakadia | H04L 41/0816 |
| 9,985,863 B2 | 5/2018 | Fletcher et al. | |
| 2010/0145755 A1* | 6/2010 | Narkilahti | G06Q 40/08 |
| | | | 709/224 |
| 2010/0274637 A1* | 10/2010 | Li | H04L 41/147 |
| | | | 379/265.06 |
| 2013/0182700 A1 | 7/2013 | Figura | |
| 2014/0376709 A1* | 12/2014 | Shaffer | H04M 3/5175 |
| | | | 379/265.06 |
| 2015/0138988 A1* | 5/2015 | Shaw | H04L 43/16 |
| | | | 370/241 |
| 2016/0112894 A1* | 4/2016 | Lau | H04B 17/318 |
| | | | 370/252 |
| 2017/0149604 A1* | 5/2017 | Burford | H04L 41/0681 |
| 2017/0272319 A1 | 9/2017 | Sheen | |
| 2017/0295078 A1* | 10/2017 | Medas | H04L 41/5009 |
| 2019/0132224 A1* | 5/2019 | Verma | G06K 9/6267 |
| 2019/0296997 A1* | 9/2019 | Menon | H04L 41/5009 |
| 2019/0334784 A1 | 10/2019 | Kvernvik | |
| 2019/0335351 A1* | 10/2019 | Hui | H04L 41/5067 |
| 2020/0052979 A1* | 2/2020 | Clemm | H04L 41/5019 |

* cited by examiner

THRESHOLD SELECTION FOR KPI CANDIDACY IN ROOT CAUSE ANALYSIS OF NETWORK ISSUES

RELATED APPLICATION

This application is a continuation of U.S. patent application Ser. No. 17/104,091, filed on Nov. 25, 2020, U.S. patent application Ser. No. 16/131,143, filed on Sep. 14, 2018, both entitled THRESHOLD SELECTION FOR KPI CANDIDACY IN ROOT CAUSE ANALYSIS OF NETWORK ISSUES, by Thampy et al., the entire contents of which are incorporated by reference herein.

TECHNICAL FIELD

The present disclosure relates generally to computer networks, and, more particularly, to threshold selection for key performance indicator (KPI) candidacy in root cause analysis of network issues.

BACKGROUND

Networks are large-scale distributed systems governed by complex dynamics and very large number of parameters. In general, network assurance involves applying analytics to captured network information, to assess the health of the network. For example, a network assurance system may track and assess metrics such as available bandwidth, packet loss, jitter, and the like, to ensure that the experiences of users of the network are not impinged. However, as networks continue to evolve, so too will the number of applications present in a given network, as well as the number of metrics available from the network.

DESCRIPTION OF EXAMPLE EMBODIMENTS

Overview

Figure 1A:
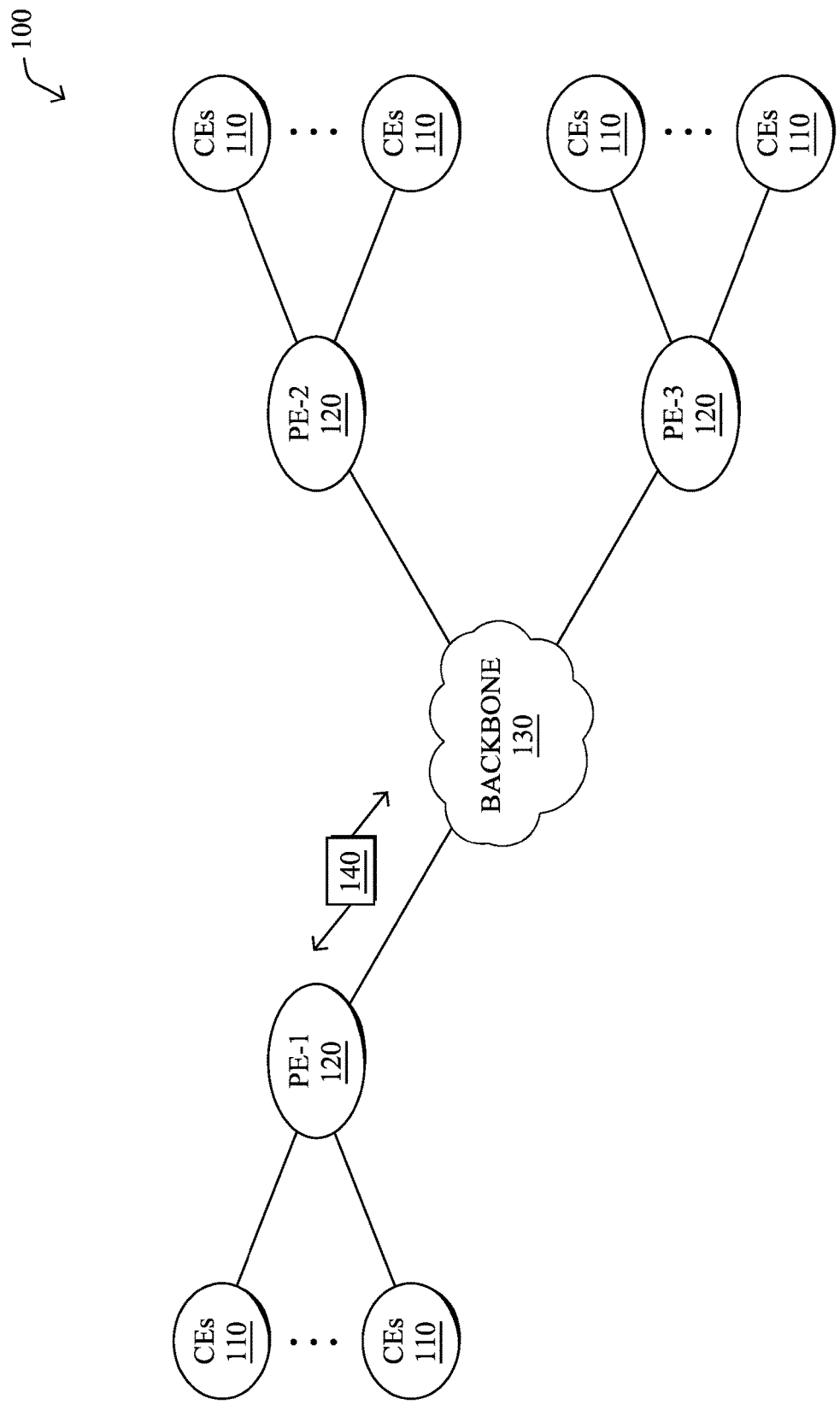
FIGS. 1A-1B illustrate an example communication network.

According to one or more embodiments of the disclosure, a network assurance service that monitors a network maps time series of values of key performance indicator (KPIs) measured from the network to lists of unique values from the time series. The service sets a target alarm rate for anomaly detection alarms raised by the network assurance service. The service uses an optimization function to identify a set of thresholds for the KPIs. The optimization function is based on: a comparison between the target alarm rate and a fraction of network issues flagged by the service as outliers, KPI thresholds selected based on the lists of unique values from the time series, and a number of thresholds that the KPIs must cross for the service to raise an alarm. The service raises an anomaly detection alarm for the monitored network based on the identified set of thresholds for the KPIs.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/ Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
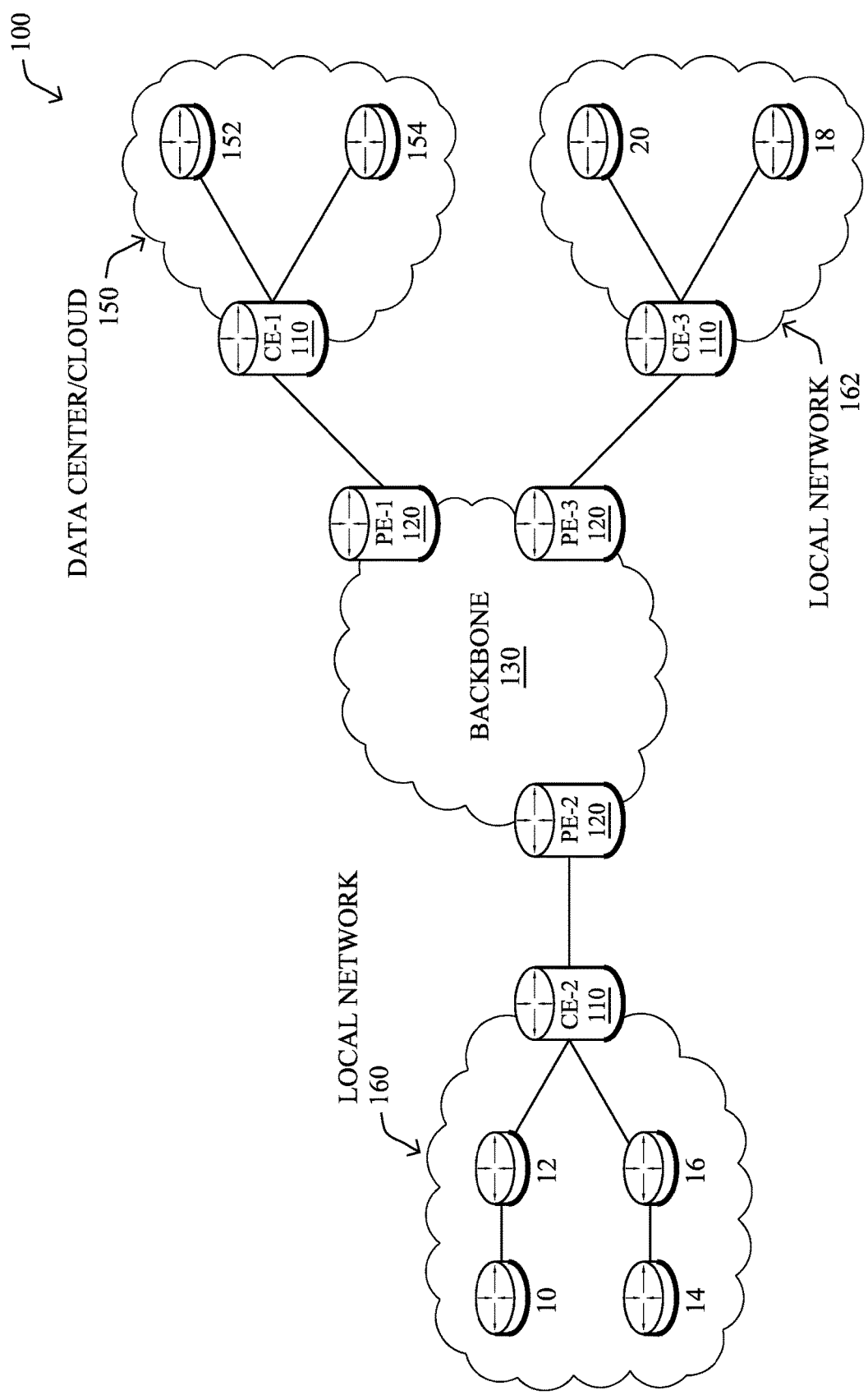

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
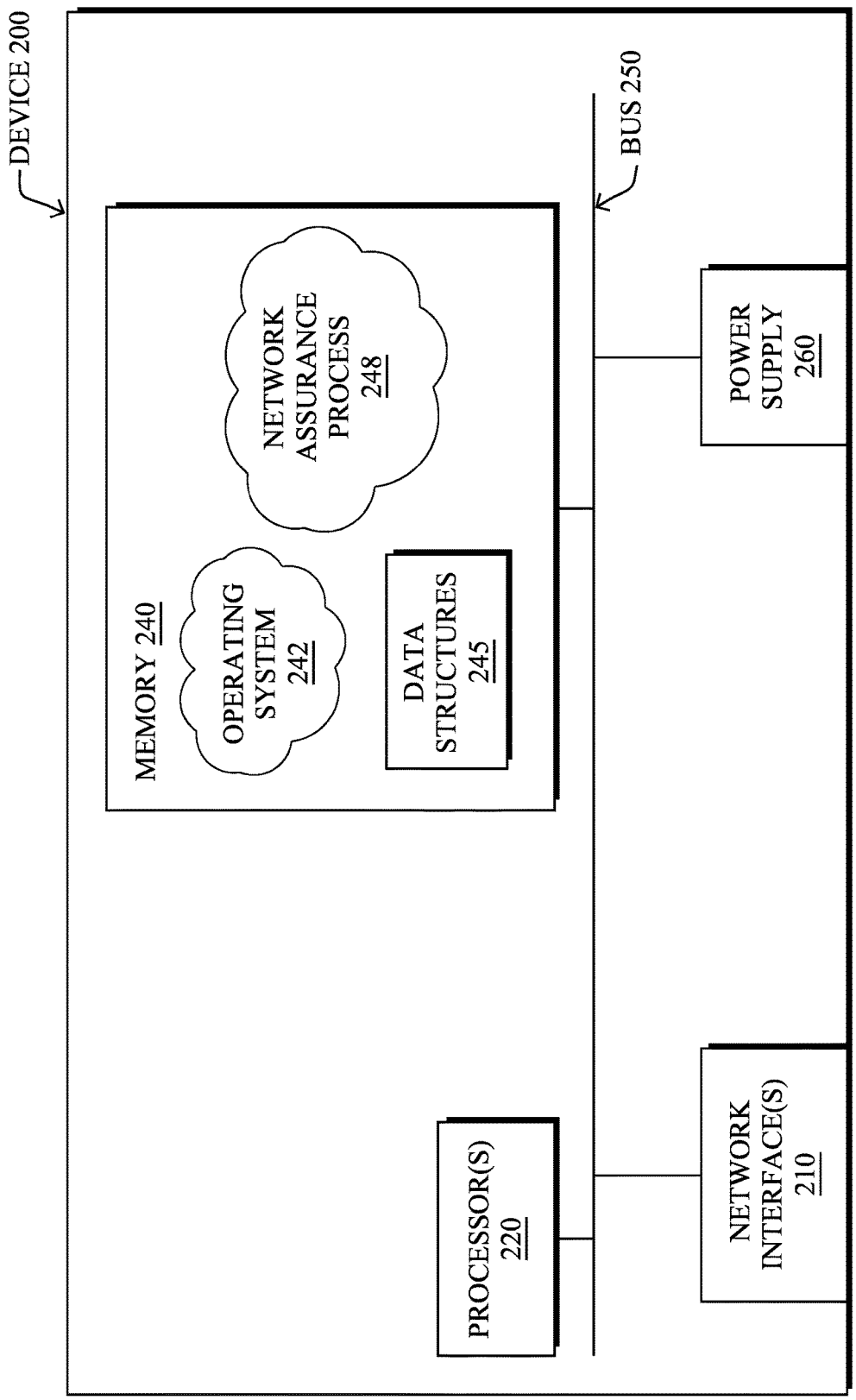
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason_code to the assurance system. To evaluate a rule regarding these conditions, the network assurance system may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may also utilize machine learning techniques, to enforce policies and to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
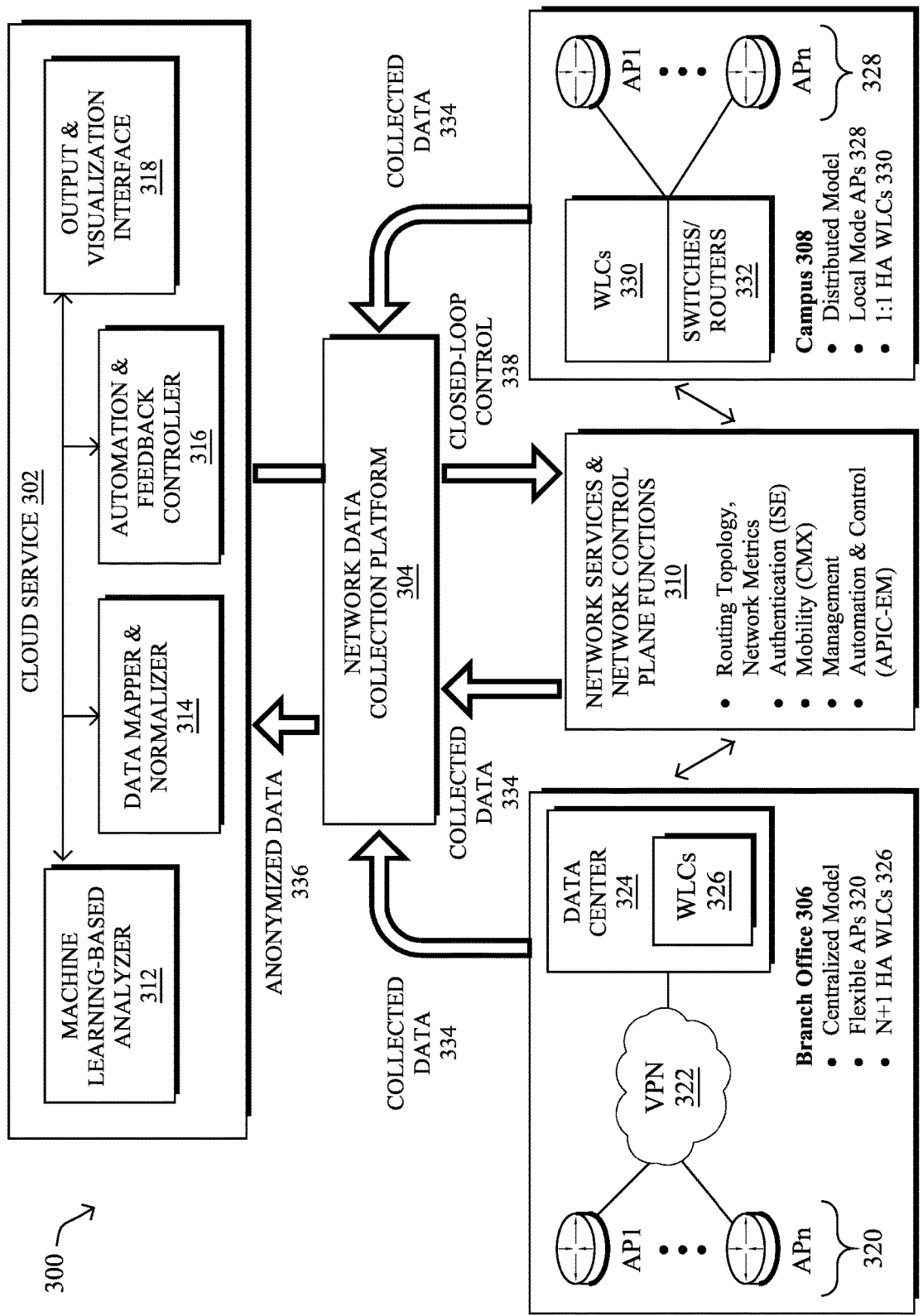
FIG. 3 illustrates an example network assurance system.

FIG. 3 illustrates an example network assurance system 300, according to various embodiments. As shown, at the core of network assurance system 300 may be a cloud service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point AP1 through nth access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point AP1 through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning (ML)-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint client device, networking device in branch office 306 or campus 308, or a network service or control plane function 310, to adjust its operations (e.g., by signaling an endpoint to use a particular AP 320 or 328, etc.).

As noted above, a network assurance service may provide anomaly detection alarms/alerts for a network monitored by the service, potentially with root cause information, for review by a network administrator of the monitored network. However, too many alarms raised by the service may overwhelm an administrator. Conversely, too few alarms may mean that important issues remain unaddressed.

Threshold Selection for KPI Candidacy in Root Cause Analysis of Network Issues

The techniques herein allow for the selection of optimal thresholds within a network assurance service for key performance indicators (KPIs) of a monitored network that can be used for providing alarms/alerts to a network administrator. In some aspects, these KPIs may be "root-causing" KPIs that help to explain network anomalies detected by the network assurance service.

Specifically, according to one or more embodiments of the disclosure as described in detail below, a network assurance service that monitors a network maps time series of values of key performance indicator (KPIs) measured from the network to lists of unique values from the time series. The service sets a target alarm rate for anomaly detection alarms raised by the network assurance service. The service uses an optimization function to identify a set of thresholds for the KPIs. The optimization function is based on: a comparison between the target alarm rate and a fraction of network issues flagged by the service as outliers, KPI thresholds selected based on the lists of unique values from the time series, and a number of thresholds that the KPIs must cross for the service to raise an alarm. The service raises an anomaly detection alarm for the monitored network based on the identified set of thresholds for the KPIs.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Figure 4:
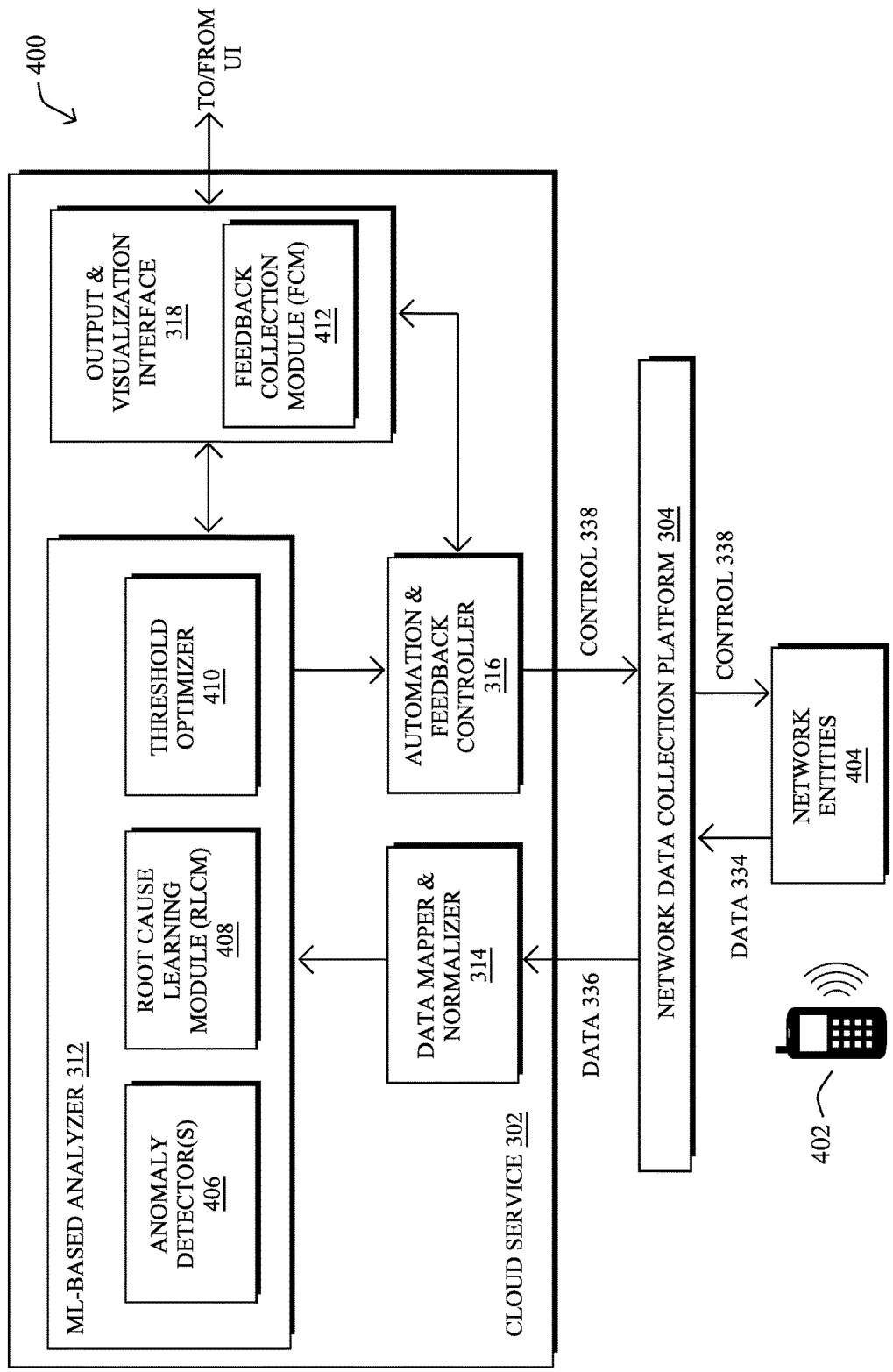
FIG. 4 illustrates an example architecture for performing pattern discovery in a network assurance service.

Operationally, FIG. 4 illustrates an example architecture 400 for performing pattern discovery in a network assurance service, according to various embodiments. At the core of architecture 400 may be the following components: one or more anomaly detectors 406, a root cause learning module (RCLM) 408, a threshold optimizer 410, and/or a feedback collection module (FCM) 412. In some implementations, the components 406-412 of architecture 400 may be implemented within a network assurance system, such as system 300 shown in FIG. 3. Accordingly, the components 406-412 of architecture 400 shown may be implemented as part of cloud service 302 (e.g., as part of machine learning-based analyzer 312 and/or output and visualization interface 318), as part of network data collection platform 304, and/or on one or more network elements/entities 404 that communicate with one or more client devices 402 within the monitored network itself. Further, these components 406-412 may be implemented in a distributed manner or implemented as its own stand-alone service, either as part of the local network under observation or as a remote service. In addition, the functionalities of the components of architecture 400 may be combined, omitted, or implemented as part of other processes, as desired.

During operation, service 302 may receive telemetry data from the monitored network (e.g., anonymized data 336 and/or data 334) and, in turn, assess the data using one or more anomaly detectors 406. At the core of each anomaly detector 406 may be a corresponding anomaly detection model, such as an unsupervised learning-based model. When an anomaly detector 406 detects a network anomaly, output and visualization interface 318 may send an anomaly detection alert to a user interface (UI) for review by a subject matter expert (SME), network administrator, or other user. Notably, an anomaly detector 406 may assess any number of different network behaviors captured by the telemetry data (e.g., number of wireless onboarding failures, onboarding times, DHCP failures, etc.) and, if the observed behavior differs from the modeled behavior by a threshold amount, the anomaly detector 406 may report the anomaly to the user interface via network anomaly, output and visualization interface 318.

In order to describe the techniques herein, the following terms are introduced for illustrative purposes:

A feedback is a rating given by a given ranker (e.g., identified by a rankerId) on a given resource (e.g., an alert raised by the system, identified by a resourceId). Such ratings may be on any scale, as desired. For example, the ratings may be binary (e.g., 'like' or 'dislike'), ternary (e.g., 'like,' 'dislike,' and 'indifferent'), or the like. Additionally, these ratings can be represented numerically, in some cases. For example, '1'='like,' '−1'='dislike,' '0'='indifferent,' etc.

A ranker is an end user, such as an SME, that provides one or more feedbacks on any number of resources to the network assurance service. If multiple feedbacks were provided on the same resource, only the most recent one is considered.

A resource is an element that can be rated by a ranker via a feedback. In the context of root cause analysis, resources relate to different candidate root causes proposed by the system.

According to various embodiments, architecture 400 may include feedback collection module (FCM) 412, such as part of output and visualization interface 318 or other element of architecture 400. During operation, FCM 412 is responsible for collecting feedback on different resources. In a simple embodiment, FCM 412 may include a combination of UI elements provided to the UI (e.g., a display, etc.), application programming interfaces (APIs), and/or databases that allow rankers to provide explicit feedback on the different resources. These feedbacks are typically in the form of like/dislike cues and are explicitly associated to a given root cause.

In another embodiment, FCM 412 may allow for feedback in the form of free-form text input from the UI and leverage Natural Language Understanding and Sentiment Analysis to assign similar scores to underlying root causes. Such an embodiment makes the process more natural to the user, but at the expense of a level of indirection that must be accounted for when exploiting these feedbacks.

In a further embodiment, FCM 412 may collect feedback generated by a third party application/system in charge of exploiting the root cause proposed by the system. For example, automation and feedback controller 316 or another mechanism may use root cause information for purposes of remediation (e.g., by controlling or adjusting the monitored network) and, based on its effects, provide feedback to FCM 412. For example, if the root cause of an on-boarding issue relates to a specific device causing the trouble (e.g., client 402), such a mechanism could blacklist the "bad apple." Thus, if the issue does not persist after the remediation action, the mechanism could provide an automatic feedback, thus validating the root raised by the system in the first place.

Another potential component of architecture 400 is the root cause learning module (RCLM) 408, according to various embodiments. In general, RCLM 408 is in charge of identifying the root causes for anomalies detected in the monitored network by anomaly detector(s) 406. In some cases, RCLM 408 may perform its own analysis on metrics captured from the monitored network, which may or may not differ from those that triggered anomaly detector 406 to detect an anomaly.

As noted above, service 300 may use machine learning to detect anomalies (e.g., abnormal behaviors/patterns), as well as potentially identifying the underlying root cause, so as to trigger actionable remediation. In particular, service 300 may employ the use of a two-layered approach to raise alarms. The first layer, anomaly detector(s) 406 may use a dual-regression on percentile values outputting a probable range of values for a given variable of interest, or using a neural network, to assess measurements from the monitored network and detect anomalous network behaviors. The second layer, RCLM 408 may, in turn, act to determine the probable cause of the detected anomaly. For example, a low throughput anomaly associated with a particular AP may be highly correlated to the wireless channel and number of clients of the AP.

In some aspects, the techniques introduced herein utilize a two pronged approach to efficiently and automatically setting root cause thresholds within a network assurance service, while simultaneously satisfying other practical constraints and identifying real issues. While these techniques do allow for on-premise deployments of the network assurance service, the techniques can equally be applied in a centralized or cloud-based implementation, as well.

The KPIs received by cloud service 302 for analysis by analyzer 312 (e.g., as data 336) may be represented as time series. For example, the KPIs may be time series of metrics such as received signal strength indicator (RSSI) measurements, signal to noise ratio (SNR), ratio of clients with low RSSI metrics (e.g., <−75 dB, packet failure rates, and the like, associated with a particular network entity 404, such as an AP, WLC, etc. As noted above, a simple strategy for reporting anomaly detection alerts would be to preset a threshold for each of these KPIs, for purposes of reporting anomalies and their potential root causes. However, different clients can exhibit different levels of utilization, meaning that if the threshold is set too low, there will be a lot more false positives and, conversely, too high of a threshold would lead to missed alarms.

Another strategy that service 302 could use for purposes of reporting network anomalies can leverage percentile level thresholds. For example, if a given KPI is greater than the 95$^{th}$ percentile over the course of the prior month, this can trigger an alarm. This approach, too, has certain downsides. Notably, some KPIs exhibit very discrete sets of values, e.g., [0, 0, 0, 0, 0, 1]. In this case, the 95$^{th}$ percentile, the 85$^{th}$ percentile, the 75$^{th}$ percentile, and so on, would always be a value greater than zero making the choice of percentiles idempotent (i.e., setting different values does not alter the entities that get flagged).

Figure 5:
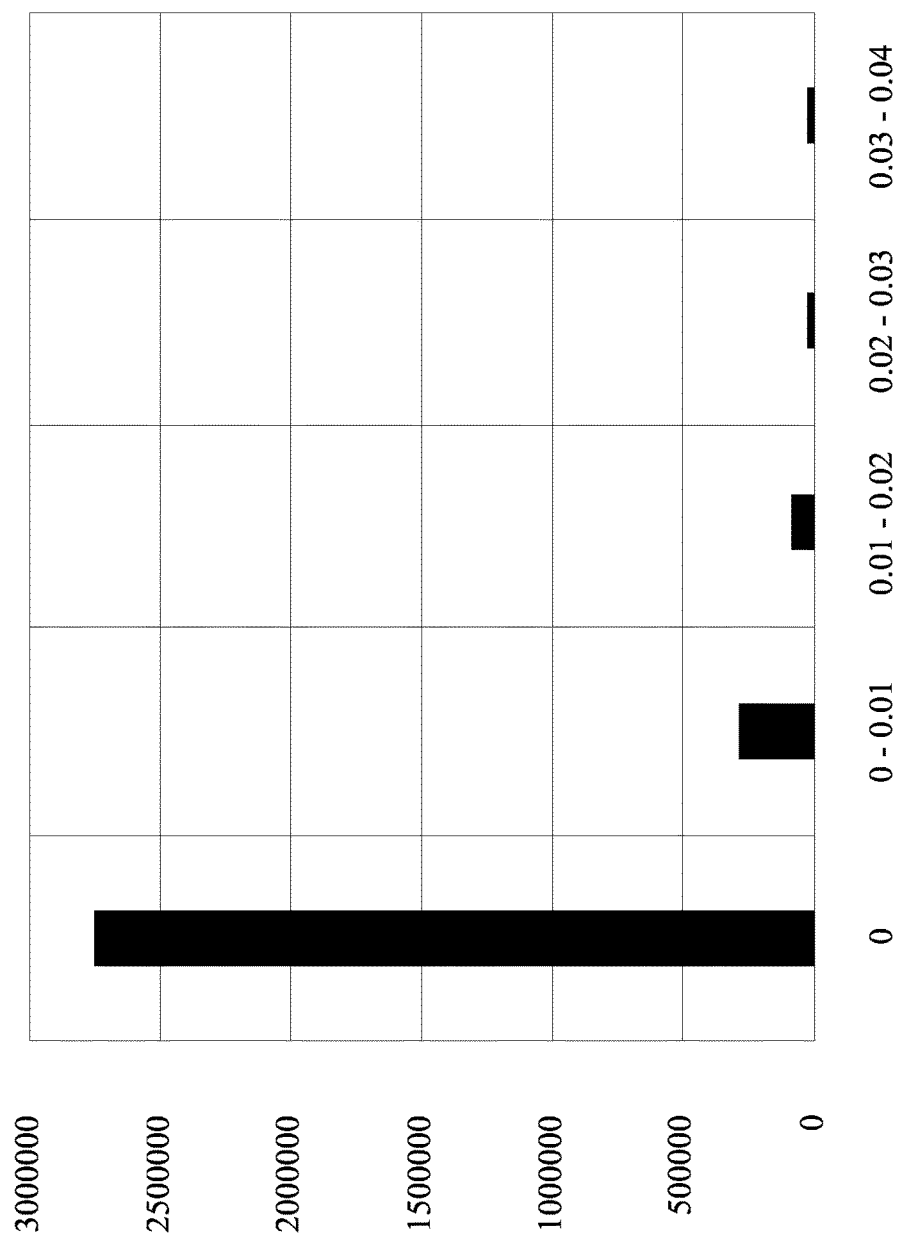
FIG. 5 illustrates an example key performance indicator (KPI) for a wireless network.

An example KPI is shown in plot 500 in FIG. 5. As shown, the packet failure rate and frequency of values that they tend to take are plotted in plot 500. For the vast majority of devices, no packet failures are experienced at all. From plot 500, a few observations can be made:

When users change threshold levels and don't see any difference in the issues being flagged, they can become confused.

Users and SMEs also tend to have a prior estimate of what the expected alarm rate is. As used herein, the target rate ("Tr") refers to the rate at which anomaly alarms are raised by the network assurance service. Typically, Tr tends to be a small number, such as between 0.1% and 1%.

Users and SMEs also are more comfortable in using thresholds that make sense on visual inspection. This is particularly true in unsupervised learning settings where there is no ground truth to bank on, except the opinion of a collection of SMEs.

Referring again to FIG. 4, threshold optimizer 410 may be configured to optimally select the thresholds used by service 302 for purposes of raising anomaly detection alerts and providing root cause analysis for the anomalies. Such an approach is also useful during a cold-start while onboarding a new network for monitoring by service 302.

According to various embodiments, instead of setting thresholds as percentiles, threshold optimizer 410 may begin by finding the unique list of values in the KPI series. For example, consider a KPI time series of [0, 0, 0, 0, 0, 0, 4, 4, 4]. In such a case, threshold optimizer may map this time series to [0, 4], the list of unique values from this time series. From these, as detailed below, threshold optimizer 410 may choose threshold cut points, which are indices of the array. For example, in the case of mapping [0, 0, 0, 0, 0, 0, 4, 4, 4] to [0, 4], threshold optimizer 410 may set the cut points at index=0 and index=1. In another example, threshold optimizer 410 may map KPI time series [0, 5, 5, 3, 3, 3, 3, 5, 0] to [0, 3, 5], with cut points at index=0, 1, 2. By mapping the KPI time series to lists of unique values/KPI measurements, this guarantees that any choice of thresholds chosen will always lead to changes in the set of entities 404 flagged as outliers.

Once threshold optimizer 410 has mapped the KPI time series to lists of unique values from the time series, threshold optimizer 410 may then choose a list of indices/cut points for each KPI under consideration. For example, threshold optimizer 410 may select index=0 for list [0, 4] for a first KPI, index=1 for list [0, 3, 5] for a second KPI, etc.

In addition to selecting cut points, threshold optimizer 410 may select a Tr value that specifies the target rate at which service 302 is expected to report anomaly detection alarms. In some embodiments, FCM 412 can collect feedback regarding Tr from the user via the UI. For example, FCM 412 may allow the user to rate a reported anomaly with a thumbs up or a thumbs down, to indicate whether the user considers the reported anomaly to be of relevance. In turn, threshold optimizer 410 may use this feedback to dynamically adjust the Tr value over time (e.g., by lowering the reporting rate if the user deems too many alerts as irrelevant or increasing the reporting rate if the user consistently deems the reported alerts as relevant). In another embodiment, threshold optimizer 410 may adjust Tr based on feedback from a third party application that determines whether a given issue meets specific criteria to be considered as valid. As would be appreciated, Tr can be represented as a percentage, number of anomalies in a predefined time period (e.g., reported anomalies per day, week, etc.).

In some embodiments, threshold optimizer 410 may map the chosen indices/cut points from above to percentiles. In general, it is preferred that these percentiles are in general agreement with one another. For example, if threshold optimizer 410 has to choose thresholds for two KPIs, a pair of percentiles of [0.9, 0.9] may be more agreeable to a user than a pair of [0.7, 0.99], which is likely to cause extra scrutiny and trigger a skeptical adoption pattern.

Threshold optimizer 410 may also choose the number of rules that need to be triggered, for an entity 404 to be flagged by analyzer 312 as a behavioral anomaly. For example, an AP that exhibits only a single anomalous KPI may be of lower concern than one that exhibits multiple anomalous KPIs. This selection may be based on feedback from FCM 412 (e.g., as specified by a SME) or preset using predefined rules.

According to various embodiments, threshold optimizer 420 may employ a parameter optimization process using a custom optimization function. In general, the optimization function may take as input a list of threshold parameters, a Tr value, and the KPI time series data. The purpose of this optimization function is to apply the thresholds and return the set of entities 404 flagged as issues. In some embodiments, rules may also be hardcoded into the optimization function, to improve its precision in capturing true positives at the cost of lower recall. For example, one hardcoded rule may specify that if the radio interference of a particular entity 404 is greater than 50, flag that entity as a problem/root cause of the issue.

One example optimization function that threshold optimizer 410 may utilize is as follows:

$$f(x, \theta) = \left|x - t_R\right| + \frac{\Sigma \theta^2}{(\Sigma \theta)^2} + N$$

where x is the fraction of issues flagged as an outlier. The first term, $|x-t_R|$ favors x-values that are very close to Tr and monotonically increases everywhere else. The second term above favors a collection of parameters that are close to each other, with the theta (θ) values being the chosen thresholds. Finally, N in the above function denotes the number of theta thresholds that need to be tripped, to get the overall anomaly detection alarm to trigger. Note that all of these parameters may be normalized to be between 0 and 1, in most cases.

To solve the optimization function and find the parameter values, threshold optimizer 410 may employ any number of optimization methods. For example, in some embodiments, threshold optimizer 410 may apply a Nelder-Mead optimization or a Limited Memory Broyden-Fletcher-Goldfarb-Shanno (L-BFGS) optimization to the optimization function. Alternatively, threshold optimizer 410 may employ a brute force grid search, to find the optimal parameter values for its optimization function.

Using the parameters from the optimization function identified by threshold optimizer 410, analyzer 312 may report anomaly detection alarms via output and visualization interface 318. For example, such an alarm may identify a particular network entity 404 as behaving abnormally, based on a combination of any number of its associated KPIs. By controlling the KPI thresholds used for reporting, as well as potentially the number of rule violations needed to raise an alarm, the system can control which anomalies are actually reported and the rate of the reporting, so as to provide only the most relevant anomalies to the user.

A prototype of the techniques herein was constructed and tested against real network data, to identify the KPI thresholds using a grid search approach. The results for two test networks are shown below in Tables 1-2 for the first network and Tables 3-4 for the second network.

TABLE 1

| KPI | Absolute | Frequency Weighted Order | Condition | Direction | Percentiles |
|---|---|---|---|---|---|
| Interference | 40 | 1 | AND | Greater | 0.9896 |
| Traffic | 10 | 1 | AND | Greater | 0.9 |
| lowRssiClientRatio75 | 0.85 | 1 | AND | Greater | 0.9 |
| lowRssiClientRatio80 | 0.7 | 1 | AND | Greater | 0.9 |
| packetFailureRate | 0.05 | 1 | AND | Greater | 0.9 |
| deltaPacketRetries | 1000000 | 1 | AND | Greater | 0.9 |
| avgClientSnr | 15 | 1 | AND | Lesser | 0.01 |

TABLE 2

| Frequency | N-Conditions | Outlier Rate | Outliers | Total |
|---|---|---|---|---|
| 2.4 GHz | 4 | 0.9% | 10 | 1123 |
| 2.4 GHz and 5 GHz | 3 | 7.7% | 87 | 1123 |
| 5 GHz | 4 | 0.1% | 1 | 1123 |

TABLE 3

| KPI | Absolute | Frequency Weighted Order | Condition | Direction | Percentiles |
|---|---|---|---|---|---|
| Interference | 40 | 1 | AND | Greater | 0.9896 |
| Traffic | 10 | 1 | AND | Greater | 0.9 |
| lowRssiClientRatio75 | 0.85 | 1 | AND | Greater | 0.9 |
| lowRssiClientRatio80 | 0.7 | 1 | AND | Greater | 0.9 |
| packetFailureRate | 0.05 | 1 | AND | Greater | 0.9 |
| deltaPacketRetries | 1000000 | 1 | AND | Greater | 0.9 |
| avgClientSnr | 15 | 1 | AND | Lesser | 0.01 |

TABLE 4

| Frequency | N-Conditions | Outlier Rate | Outliers | Total |
|---|---|---|---|---|
| 2.4 GHz | 2 | 1.6% | 5 | 314 |
| 2.4 GHz and 5 GHz | 3 | 1.0% | 3 | 314 |
| 5 GHz | 3 | 11.5% | 36 | 314 |

Figure 6:
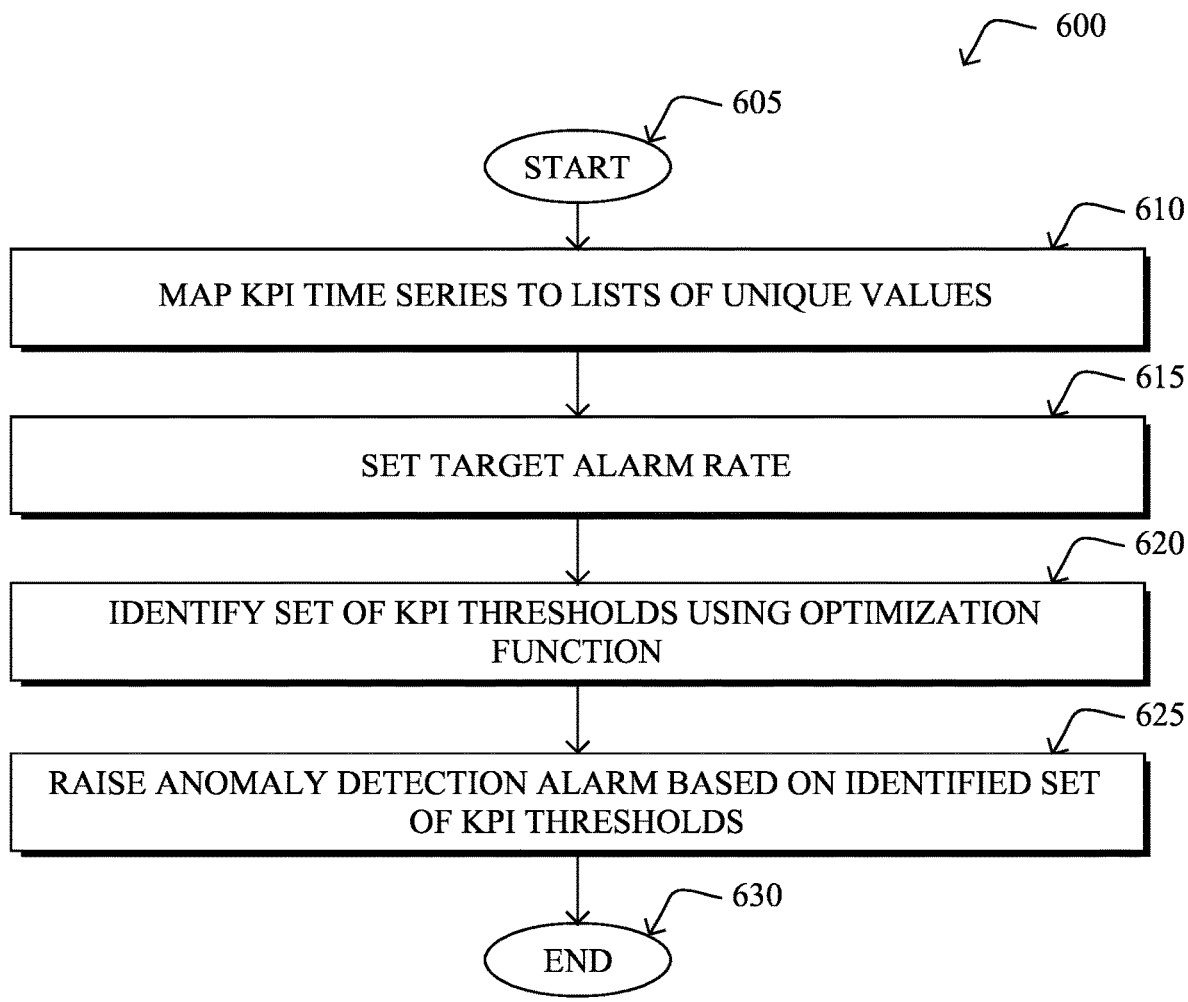
FIG. 6 illustrates an example simplified procedure for threshold selection for a KPI in a network assurance system.

FIG. 6 illustrates an example simplified procedure for threshold selection for a KPI in a network assurance system, in a network in accordance with one or more embodiments described herein. For example, a non-generic, specifically configured device (e.g., device 200) may perform procedure 600 by executing stored instructions (e.g., process 248), to provide a network assurance service to a monitored network. The procedure 600 may start at step 605, and continues to step 610, where, as described in greater detail above, the network assurance service may map time series of values of key performance indicator (KPIs) measured from the network to lists of unique values from the time series.

At step 615, as detailed above, the network assurance service may set a target alarm rate for anomaly detection alarms raised by the network assurance service. Such a rate may represent, for example, a percentage of raised alarms or a number of raised alarms in a predefined time period (e.g. per hour, day, week, etc.). In some embodiments, the service may receive user feedback regarding anomaly detection alarms raised by the network assurance service. For example, a user may specify whether a given alarm is of relevance or not. In turn, the service may select the target alarm rate based on the received user feedback, such as by lowering the rate, if the user deems a number of alarms as irrelevant, or increasing the rate, if the reported alarms are deemed relevant to the user.

At step 620, the network assurance service may use an optimization function to identify a set of thresholds for the KPIs, as described in greater detail above. In various embodiments, the optimization function may be based on any or all of the following: a comparison between the target alarm rate and a fraction of network issues flagged by the service as outliers, KPI thresholds selected based on the lists of unique values from the time series, and/or a number of thresholds that the KPIs must cross for the service to raise an alarm. In various embodiments, the service may apply a grid search, Nelder-Mead optimization, or L-BFGS optimization to the optimization function, to determine the optimal parameters for reporting anomaly alarms.

At step 625, as detailed above, the network assurance service may raise an anomaly detection alarm for the monitored network based on the identified set of thresholds for the KPIs. For example, the service may report a particular AP as behaving abnormally, if its KPI values exceed the thresholds shown above in Table 1. By controlling the number of thresholds that need to be crossed, as well as the thresholds themselves, the service can control the rate of anomalies reported to the user, so that only the most important and relevant anomalies are reported. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce an approach for optimizing the KPI thresholds used for reporting network anomaly alerts/alarms. As noted above, approaches that use hardcoded thresholds, or are based on percentiles, may have little effect on the actual issues and network entities flagged by the system. This is particularly true in the case of KPIs that tend to take on discrete values, meaning that the same entity may be reported as anomalous, regardless of whether the KPI threshold is set at the $75^{th}$, $85^{th}$, or $95^{th}$ percentile. In addition, the techniques herein allow for the control over the alarm rate at which the network assurance service raises anomaly detection alarms.

While there have been shown and described illustrative embodiments that provide for threshold selection for KPI candidacy in root cause analysis of network issues, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, such as BGP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, by a cloud-based network assurance service that monitors a network, a series of values corresponding to key performance indicators (KPIs) from a network of computing devices;
   setting, by the cloud-based network assurance service, a target level of service applying to at least one computing device from the network of computing devices;
   using, by the cloud-based network assurance service, an optimization function to identify a set of thresholds for the KPIs, wherein the optimization function is based on an inferred multi-dimensional relationship between the KPIs and the target level of service; and
   raising, by the cloud-based network assurance service, an alert for the monitored network based on a failure to provide the target level of service.

2. The method of claim 1, wherein the optimization function is a trained machine learning-based model.

3. The method of claim 2, wherein the machine learning-based model is trained using a supervised learning technique.

4. The method of claim 1, further comprising:
   evaluating which KPI anomalies were a root cause of the monitored network not providing the target level of service; and
   including inferred root cause information in the alert.

5. The method of claim 1, wherein the alert indicates a KPI metric has exceeded a predetermined threshold.

6. The method of claim 1, further comprising providing a visualization interface indicative of a state of the monitored network.

7. The method of claim 1, further comprising:
   determining if a condition of the alert is subject to remediation; and
   responsive to a determination that the condition is subject to remediation, identifying at least one configuration change predicted to remediate the condition.

8. The method of claim 1, wherein using the optimization function to identify a set of thresholds for the KPIs further comprises finding patterns in the KPIs that relate to network and device behaviors.

9. The method of claim 1, wherein using the optimization function to identify a set of thresholds for the KPIs further comprises:
   predicting a user experience associated with use of the at least one computing device; and
   relating the user experience to the target level of service.

10. The method of claim 1, wherein using the optimization function to identify a set of thresholds for the KPIs further comprises predicting a future state of the network.

11. A system comprising:
    a network data collection platform configured to receive a series of values corresponding to key performance indicators (KPIs) from a network of computing devices; and
    a cloud service configured to receive information regarding the KPIs from the network data collection platform, the cloud service including computer-readable media encoded with computer-executable instructions, which when executed by one or more processors, cause the cloud service to:
    set a target level of service applying to at least one computing device from the network of computing devices;
    use an optimization function to identify a set of thresholds for the KPIs, wherein the optimization function is based on an inferred multi-dimensional relationship between the KPIs and the target level of service; and raise an alert for a network monitored by the cloud service based on a failure to provide the target level of service.

12. The system of claim 11, wherein the optimization function is a trained machine learning-based model.

13. The system of claim 12, wherein the machine learning-based model is trained using a supervised learning technique.

14. The system of claim 11, wherein the cloud service is further caused to:

evaluate which KPI anomalies were a root cause of the monitored network not providing the target level of service; and include inferred root cause information in the alert.

15. The system of claim 11, wherein the alert indicates a KPI metric has exceeded a predetermined threshold.

16. The system of claim 11, further comprising a visualization interface configured to provide information indicative of a state of the monitored network.

17. The system of claim 11, wherein the cloud service is further caused to:

determine if a condition of the alert is subject to remediation; and responsive to a determination that the condition is subject to remediation, identify at least one configuration change predicted to remediate the condition.

18. The system of claim 11, wherein the cloud service uses the optimization function to identify a set of thresholds for the KPIs by finding patterns in the KPIs that relate to network and device behaviors.

19. The system of claim 11, wherein the cloud service uses the optimization function to identify a set of thresholds for the KPIs by:

predicting a user experience associated with use of the at least one computing device; and relating the user experience to the target level of service.

20. The system of claim 11, wherein the cloud service uses the optimization function to identify a set of thresholds for the KPIs by predicting a future state of the network.

* * * * *

UNITED STATES PATENT AND TRADEMARK OFFICE
CERTIFICATE OF CORRECTION

| | |
|---|---|
| PATENT NO. | : 11,616,682 B2 |
| APPLICATION NO. | : 17/716913 |
| DATED | : March 28, 2023 |
| INVENTOR(S) | : Sajjit Thampy et al. |

It is certified that error appears in the above-identified patent and that said Letters Patent is hereby corrected as shown below:

In the Specification

Column 4, Line 16, please amend as shown:
the next frontier in the evolution of the Internet is the ability to Column 5, Line 14, please amend as shown:
system bus 250, and is powered by a power supply 260.

Column 8, Line 54, please amend as shown:
ing cloud service 302 to identify and remediate potential Signed and Sealed this
Twentieth Day of June, 2023

*Katherine Kelly Vidal*

Katherine Kelly Vidal
*Director of the United States Patent and Trademark Office*